US011328431B2

United States Patent
Wei et al.

(10) Patent No.: US 11,328,431 B2
(45) Date of Patent: May 10, 2022

(54) METHOD FOR DETERMINING A FOREGROUND IMAGE AND A BACKGROUND IMAGE

(71) Applicant: Augentix Inc., Hsinchu (TW)

(72) Inventors: Ku-Chu Wei, New Taipei (TW); Hung-Chi Fang, Hsinchu (TW)

(73) Assignee: Augentix Inc., Hsinchu (TW)

(*) Notice: Subject to any disclaimer, the term of this patent is extended or adjusted under 35 U.S.C. 154(b) by 164 days.

(21) Appl. No.: 16/882,770

(22) Filed: May 26, 2020

(65) Prior Publication Data

US 2020/0380698 A1 Dec. 3, 2020

(30) Foreign Application Priority Data

May 29, 2019 (CN) .......................... 201910455514.9

(51) Int. Cl.
*G06T 7/194* (2017.01)
*G06T 7/246* (2017.01)

(52) U.S. Cl.
CPC .............. *G06T 7/194* (2017.01); *G06T 7/248* (2017.01)

(58) Field of Classification Search
CPC ................................ G06T 7/248; G06T 7/194
See application file for complete search history.

(56) References Cited

U.S. PATENT DOCUMENTS

| | | | |
|---|---|---|---|
| 9,123,133 B1* | 9/2015 | Chen | G06T 7/194 |
| 9,767,570 B2* | 9/2017 | Li | G06K 9/00785 |
| 9,917,988 B2 | 3/2018 | Fang | |
| 9,965,865 B1* | 5/2018 | Agrawal | G06K 9/00234 |
| 10,091,386 B2 | 10/2018 | Yang | |
| 10,462,365 B1* | 10/2019 | Keegan | H04N 7/183 |
| 10,839,520 B2* | 11/2020 | Wood | G06T 7/11 |
| 10,860,836 B1* | 12/2020 | Tyagi | G06N 3/0454 |
| 10,909,349 B1* | 2/2021 | Tripathi | G06N 3/084 |
| 11,109,586 B2* | 9/2021 | Henskes | A01M 29/16 |
| 2002/0099763 A1* | 7/2002 | Kondo | G06Q 30/02 709/201 |
| 2007/0195993 A1* | 8/2007 | Chen | H04N 19/23 382/103 |

(Continued)

FOREIGN PATENT DOCUMENTS

| | | |
|---|---|---|
| TW | 201028964 A1 | 8/2010 |
| TW | 201320715 A1 | 5/2013 |

*Primary Examiner* — Mia M Thomas
(74) *Attorney, Agent, or Firm* — Winston Hsu

(57) ABSTRACT

A method for determining a foreground image and a background image, the method includes the following steps, generating a characteristic data of each of N sub-region images of in an interested region of N parent images, classifying the N sub-region images to image groups of in M image groups according to the characteristic data of each of the N sub-region images, obtaining a motion level of each of the M image groups according to a motion area of in the N sub-region images, determining whether each the image group belongs to a background image group or a foreground image group according to each the motion level of each the image group and an image quantity of in each the image group. The method can correctly determine a foreground image and a background image, even a foreground object stops moving and stays in a viewable range of an image apparatus.

20 Claims, 18 Drawing Sheets

(56) References Cited

U.S. PATENT DOCUMENTS

| | | | | |
|---|---|---|---|---|
| 2011/0157392 A1* | 6/2011 | Chou | ............... | G06T 7/194 |
| | | | | 348/222.1 |
| 2013/0162768 A1* | 6/2013 | Lie | ............... | G06V 20/49 |
| | | | | 348/E13.02 |
| 2013/0170557 A1* | 7/2013 | Wang | ............... | G06T 7/254 |
| | | | | 375/240.24 |
| 2015/0262374 A1* | 9/2015 | Huang | ............... | G06T 7/215 |
| | | | | 382/103 |
| 2015/0279052 A1* | 10/2015 | Chen | ............... | G06K 9/6273 |
| | | | | 382/103 |
| 2015/0310297 A1* | 10/2015 | Li | ............... | G06T 7/11 |
| | | | | 382/199 |
| 2018/0211113 A1* | 7/2018 | Wu | ............... | G06V 40/103 |
| 2018/0315199 A1* | 11/2018 | Socek | ............... | G06T 7/207 |
| 2019/0005653 A1* | 1/2019 | Choi | ............... | G06V 20/52 |
| 2019/0065859 A1* | 2/2019 | Togashi | ............... | G06T 7/215 |
| 2020/0218903 A1* | 7/2020 | Lee | ............... | G06K 9/3233 |
| 2020/0265565 A1* | 8/2020 | Hwang | ............... | G06T 7/50 |
| 2021/0303890 A1* | 9/2021 | Wei | ............... | G06K 9/00899 |
| 2021/0327070 A1* | 10/2021 | Wang | ............... | G06K 9/3233 |

\* cited by examiner

| Image | Average value of brightness |
|---|---|
| $VF_1$~$VF_{10}$ | 255 |
| $VF_{11}$ | 213 |
| $VF_{12}$ | 191 |
| $VF_{13}$ | 170 |
| $VF_{14}$ | 149 |
| $VF_{15}$ | 128 |
| $VF_{16}$~$VF_{30}$ | 120 |

| Brightness value | Data section | Image | Image quantity |
|---|---|---|---|
| 0~31 | $SEC_1$ | | 0 |
| 32~63 | $SEC_2$ | | 0 |
| 64~95 | $SEC_3$ | | 0 |
| 96~127 | $SEC_4$ | $VF_{16}$~$VF_{30}$ | 15 |
| 128~159 | $SEC_5$ | $VF_{14}$, $VF_{15}$ | 2 |
| 160~191 | $SEC_6$ | $VF_{12}$, $VF_{13}$ | 2 |
| 192~223 | $SEC_7$ | $VF_{11}$ | 1 |
| 224~255 | $SEC_8$ | $VF_1$~$VF_{10}$ | 10 |

FIG. 2
(PRIOR ART)

| Sub-region image | Average value of brightness |
|---|---|
| $VF_{1\_A} \sim VF_{10\_A}$ | 255 |
| $VF_{11\_A}$ | 213 |
| $VF_{12\_A}$ | 191 |
| $VF_{13\_A}$ | 170 |
| $VF_{14\_A}$ | 149 |
| $VF_{15\_A}$ | 128 |
| $VF_{16\_A} \sim VF_{30\_A}$ | 120 |

| Image group | Data section | Range of brightness value | Image | Image quantity |
|---|---|---|---|---|
| $GP_1$ | $SEC_1$ | 0~31 | | 0 |
| $GP_2$ | $SEC_2$ | 31~63 | | 0 |
| $GP_3$ | $SEC_3$ | 64~95 | | 0 |
| $GP_4$ | $SEC_4$ | 96~127 | $VF_{16\_A} \sim V_{30\_A}$ | 15 |
| $GP_5$ | $SEC_5$ | 128~159 | $VF_{14\_A}$、$VF_{15\_A}$ | 2 |
| $GP_6$ | $SEC_6$ | 160~191 | $VF_{12\_A}$、$VF_{13\_A}$ | 2 |
| $GP_7$ | $SEC_7$ | 192~223 | $VF_{11\_A}$ | 1 |
| $GP_8$ | $SEC_8$ | 224~255 | $VF_{1\_A} \sim VF_{10\_A}$ | 10 |

FIG. 7

| Sub-region image | Motion block quantity |
|---|---|
| $VF_{1\_A} \sim VF_{10\_A}$ | 0 |
| $VF_{11\_A}$ | 3 |
| $VF_{12\_A}$ | 6 |
| $VF_{13\_A}$ | 6 |
| $VF_{14\_A}$ | 9 |
| $VF_{15\_A}$ | 9 |
| $VF_{16\_A}$ | 12 |
| $VF_{17\_A}$ | 12 |
| $VF_{18\_A} \sim VF_{30\_A}$ | 0 |

| Image group | Data section | Range of brightness value | Image classification | Image quantity | Motion level |
|---|---|---|---|---|---|
| $GP_1$ | $SEC_1$ | 0~31 | | 0 | 0 |
| $GP_2$ | $SEC_2$ | 31~63 | | 0 | 0 |
| $GP_3$ | $SEC_3$ | 64~95 | | 0 | 0 |
| $GP_4$ | $SEC_4$ | 96~127 | $VF_{16\_A} \sim VF_{30\_A}$ | 15 | 24 |
| $GP_5$ | $SEC_5$ | 128~159 | $VF_{14\_A}$、$VF_{15\_A}$ | 2 | 18 |
| $GP_6$ | $SEC_6$ | 160~191 | $VF_{12\_A}$、$VF_{13\_A}$ | 2 | 12 |
| $GP_7$ | $SEC_7$ | 192~223 | $VF_{11\_A}$ | 1 | 3 |
| $GP_8$ | $SEC_8$ | 224~255 | $VF_{1\_A} \sim VF_{10\_A}$ | 10 | 0 |

FIG. 9

| Sub-region image | Motion block quantity |
|---|---|
| $VF_{2\_A} \sim VF_{10\_A}$ | 0 |
| $VF_{11\_A}$ | 3 |
| $VF_{12\_A}$ | 6 |
| $VF_{13\_A}$ | 6 |
| $VF_{14\_A}$ | 9 |
| $VF_{15\_A}$ | 9 |
| $VF_{16\_A}$ | 12 |
| $VF_{17\_A}$ | 12 |
| $VF_{18\_A} \sim VF_{31\_A}$ | 0 |

| Image group | Data section | Range of brightness value | Image classification | Image quantity | Motion level |
|---|---|---|---|---|---|
| $GP_1$ | $SEC_1$ | 0~31 | | 0 | 0 |
| $GP_2$ | $SEC_2$ | 31~63 | | 0 | 0 |
| $GP_3$ | $SEC_3$ | 64~95 | | 0 | 0 |
| $GP_4$ | $SEC_4$ | 96~127 | $VF_{16\_A} \sim VF_{31\_A}$ | 16 | 24 |
| $GP_5$ | $SEC_5$ | 128~159 | $VF_{14\_A}$、$VF_{15\_A}$ | 2 | 18 |
| $GP_6$ | $SEC_6$ | 160~191 | $VF_{12\_A}$、$VF_{13\_A}$ | 2 | 12 |
| $GP_7$ | $SEC_7$ | 192~223 | $VF_{11\_A}$ | 1 | 3 |
| $GP_8$ | $SEC_8$ | 224~255 | $VF_{2\_A} \sim VF_{10\_A}$ | 9 | 0 |

FIG. 14

| Image group | Data section | Range of brightness value | Image classification | Image quantity | Motion level | Pedestrian characteristic value |
|---|---|---|---|---|---|---|
| $GP_1$ | $SEC_1$ | 0~31 | | 0 | 0 | 0 |
| $GP_2$ | $SEC_2$ | 31~63 | | 0 | 0 | 0 |
| $GP_3$ | $SEC_3$ | 64~95 | | 0 | 0 | 0 |
| $GP_4$ | $SEC_4$ | 96~127 | | 0 | 0 | 0 |
| $GP_5$ | $SEC_5$ | 128~159 | | 0 | 0 | 0 |
| $GP_6$ | $SEC_6$ | 160~191 | $VF_{1\_C}$~$VF_{30\_C}$ | 30 | 0 | 30 |
| $GP_7$ | $SEC_7$ | 192~223 | | 0 | 0 | 0 |
| $GP_8$ | $SEC_8$ | 224~255 | | 0 | 0 | 0 |

FIG. 16

| Image group | Data section | Range of brightness value | Image classification | Image quantity | Motion level | Pedestrian characteristic value |
|---|---|---|---|---|---|---|
| $GP_1$ | $SEC_1$ | 0~31 | | 0 | 0 | 0 |
| $GP_2$ | $SEC_2$ | 31~63 | | 0 | 0 | 0 |
| $GP_3$ | $SEC_3$ | 64~95 | | 0 | 0 | 0 |
| $GP_4$ | $SEC_4$ | 96~127 | | 0 | 0 | 0 |
| $GP_5$ | $SEC_5$ | 128~159 | | 0 | 0 | 0 |
| $GP_6$ | $SEC_6$ | 160~191 | $VF_{13\_D}$~$VF_{30\_D}$ | 18 | 12 | 18 |
| $GP_7$ | $SEC_7$ | 192~223 | $VF_{11\_D}$、$VF_{12\_D}$ | 2 | 3 | 0 |
| $GP_8$ | $SEC_8$ | 224~255 | $VF_{1\_D}$~$VF_{10\_D}$ | 10 | 0 | 0 |

FIG. 18

METHOD FOR DETERMINING A FOREGROUND IMAGE AND A BACKGROUND IMAGE

BACKGROUND OF THE INVENTION

1. Field of the Invention

The present invention relates to a method for determining a foreground image and a background image, and more particularly to a method capable for correctly determining that an image is a foreground image when a foreground object stops moving.

2. Description of the Prior Art

In an image sequence which is generated by an image apparatus, an object will be regarded as a foreground object when the object moves into a viewable range of the image apparatus. An image belongs to a foreground image when a foreground object exists in the image. Moreover, an image belongs to a background image when a foreground object does not exist in the image.

In a prior art disclosed a method for determining a foreground image and a background image, the method can be divided into a determining method of registered background and a determining method of adaptive background. The determining method of registered background includes a specific image pre-selected as a registered background, and determining whether an image belongs to a foreground image or a background image according to a difference between a characteristic data of the image and a characteristic data of the registered background. However, a user needs to pre-select an image as a registered background, it is not easy for users. For example, when an image apparatus monitors an outdoor environment, an outdoor scene often have changes of light and shadow or changes of an object within the scene. Therefore, it is difficult for users to select an appropriate image as the registered background. Moreover, users will need to frequently renew the registered background. When an image apparatus monitors an indoor environment, an indoor scene could have a situation that a registered background image is not appropriated because of turning on and off a light source.

The determining method of adaptive background includes the following steps, classifying each image to each data section according to characteristic data of images of in an image sequence, determining that an image classified to a data section belongs to a background image when there is most images in the data section. For example, a simulation using brightness value as a characteristic data can further explain the determining method of adaptive background. Referring to FIG. 1, it is an illustration of images $VF_1$-$VF_{30}$ captured by an image apparatus when a black object moves from right to left into a white background. In images $VF_1$-$VF_{10}$, each of the images has a white background and belongs to the background image. In images $VF_{11}$-$VF_{15}$, there is a black object moving into each of the images. In an image $VF_{16}$, the black object has been fully entered in a viewable range of the image apparatus. In images $VF_{17}$-$VF_{30}$, the black object stops moving. Referring to FIG. 2, it is an illustration of a statistics table of characteristic data of images $VF_1$-$VF_{30}$, it includes a statistics table illustrating an image quantity of each data section, wherein each image has been classified to each data section. In FIG. 2, a brightness value is set by a specific data, the brightness value is in a range of 0 to 255, wherein the brightness value 0 means darkest, the brightness value 255 means brightest, and data sections $SEC_1$-$SEC_8$ are divided according to a size of the brightness value. Therefore, a data section $SEC_1$ corresponds to a range of the brightness value being 0 to 31, a data section $SEC_2$ corresponds to a range of the brightness value being 32 to 63, and so forth. Therefore, a data section $SEC_8$ should be corresponded to a range of the brightness value being 224 to 255. Each of images $VF_1$-$VF_{10}$ has the white background and its brightness value is 255, therefore the images $VF_1$-$VF_{10}$ should be classified to the data section $SEC_8$. In the images $VF_{11}$-$VF_{15}$, there is a black object moving into the viewable range of the image apparatus, the brightness values of the images $VF_{11}$, $VF_{12}$, $VF_{13}$, $VF_{14}$, $VF_{15}$ separately be 213, 191, 170, 149, 128, therefore the images $VF_{11}$, $VF_{12}$, $VF_{13}$, $VF_{14}$, $VF_{15}$ should be respectively classified to the data sections $SEC_7$, $SEC_6$, $SEC_6$, $SEC_5$, $SEC_5$. In the images $VF_{16}$, the black object has been fully entered in a viewable range of the image apparatus, the brightness value of the images $VF_{16}$ is 120, therefore the images $VF_{16}$ should be classified to the data section $SEC_4$. In the images $VF_{17}$-$VF_{30}$, the black object has been stopped moving, the brightness values of the images $VF_{17}$-$VF_{30}$ is 120, therefore the images $VF_{17}$-$VF_{30}$ should be classified to the data section $SEC_4$. As mentioned above, the image quantity classified to the data sections $SEC_4$-$SEC_8$ separately be 15, 2, 2, 1, 10. When using the determining method of adaptive background of the prior-art, the image belonging to the data section $SEC_4$ will be determined to the background image, because there is most images classified to the data section $SEC_4$. However, the images $VF_{16}$-$VF_{30}$ belonging to the data section $SEC_4$ have a foreground object, the images $VF_{16}$-$VF_{30}$ actually belong to the foreground image. Namely, when the foreground object stops moving and stays in the viewable range of the image apparatus, the determining method of adaptive background of the prior-art could make an incorrect determination, so this will cause inconvenience to users.

SUMMARY OF THE INVENTION

It is therefore an object of the invention to provide a method for determining a foreground image and a background image, the method includes the following steps, generating a characteristic data of each of N sub-region images of in an interested region of N parent images, classifying the N sub-region images to image groups of in M image groups according to the characteristic data of each of the N sub-region images, obtaining a motion level of each of the M image groups according to a motion area of in each of the N sub-region images, determining whether each the image group belongs to a background image group or a foreground image group according to each the motion level of each the image group and an image quantity of each the image group, wherein M and N are positive integer.

One of the major advantages of the invention is that even if a foreground object stops moving and stays in a viewable range of an image apparatus, the method of the invention can still correctly determine a foreground image and a background image, therefore the method will bring greater convenience to users.

The above and other objects, features and advantages of the invention will become apparent from the following detailed description taken with the accompanying drawings.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a prior art illustration of a statistics table of a characteristic data of each of images, it includes a statistics table illustrating an image quantity of each data section, wherein each image has been classified to each data section;

FIG. 7 is a statistics table illustrating that an image quantity of each of the image groups and a motion level of each of the image groups;

FIG. 9 is a statistics table illustrating that a motion block quantity of each of the sub-region images, an image quantity of each of the image groups and a motion level of each of the image groups;

FIG. 14 is a statistics table illustrating that an image quantity of each of the image groups and a motion level of each of the image groups;

FIG. 16 is a statistics table illustrating an image quantity, a motion level and a pedestrian characteristic value of each of the sub-region images (as FIG. 15) classified to each of the image groups;

FIG. 18 is a statistics table illustrating an image quantity, a motion level and a pedestrian characteristic value of each of the sub-region images (as FIG. 17) classified to each of the image groups.

DETAILED DESCRIPTION

Figure 3:
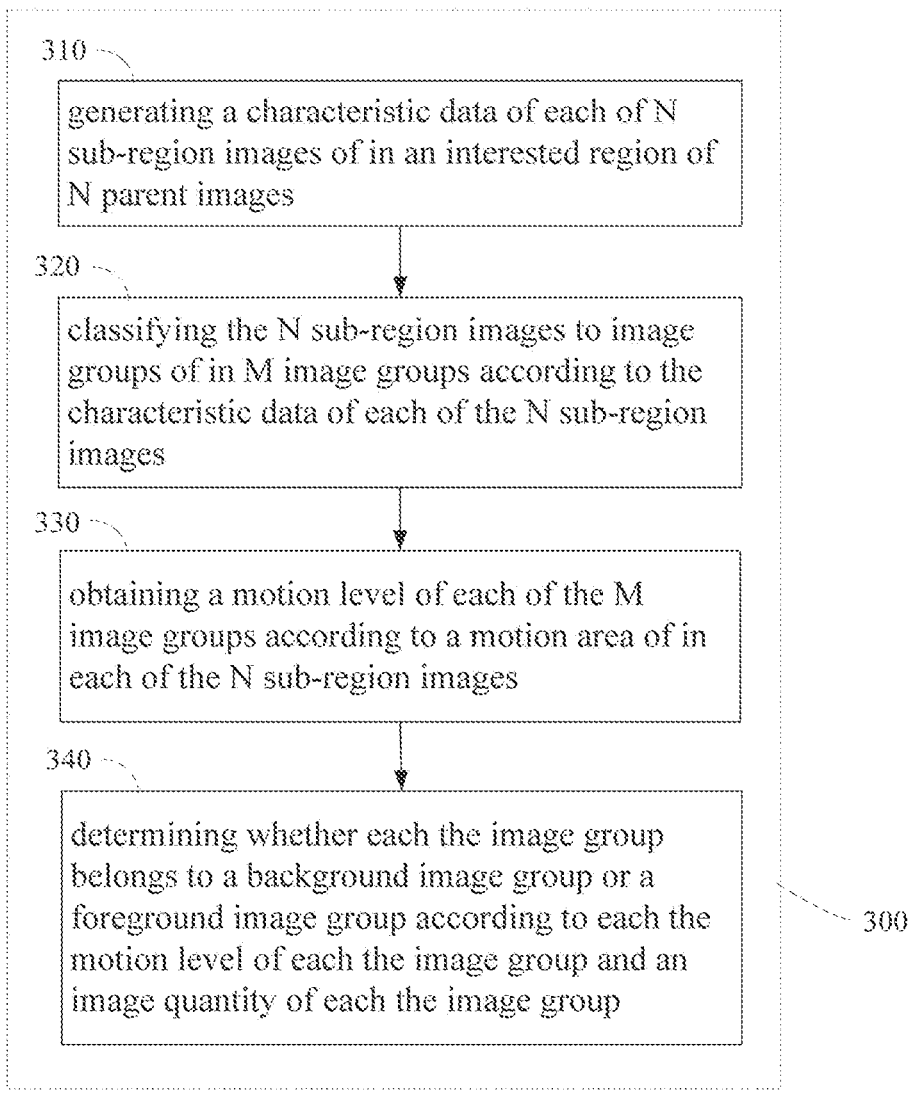
FIG. 3 is an illustration of a flowchart of the method for determining a foreground image and a background image in accordance with an embodiment of the invention.
Figure 4:
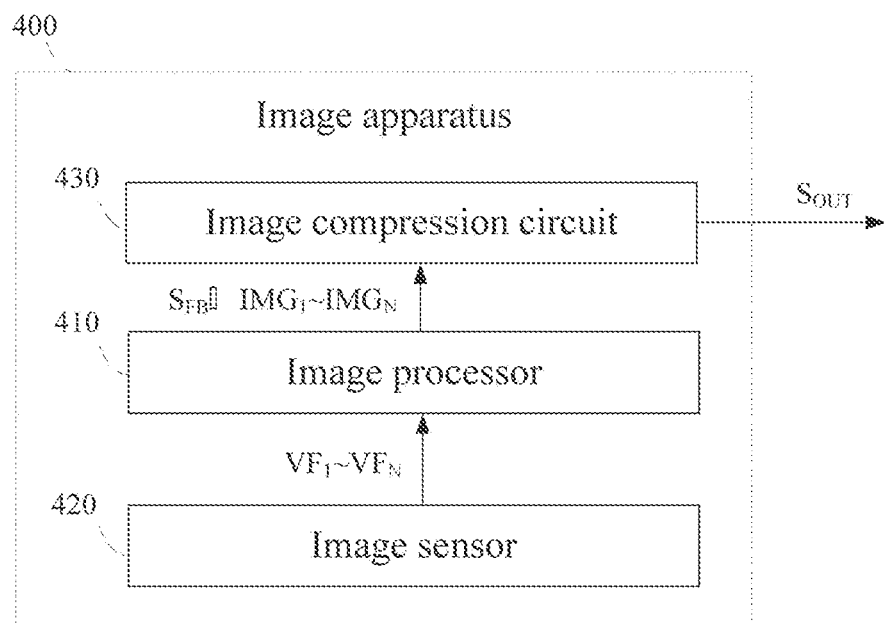
FIG. 4 is an illustration of a structure diagram of an image apparatus which can be applied to the method of the invention.

Referring to FIGS. 3 to 4, FIG. 3 is a flowchart in accordance with an embodiment of a foreground and background images determination method 300 of the invention, FIG. 4 is a structure diagram of an image apparatus 400 which can be applied to the method 300 of the invention. The image apparatus 400 comprises an image sensor 420, an image processor 410 and an image compression circuit 430. The image sensor 420 receives the light to respectively generate parent images $VF_1$-$VF_N$ during time periods $T_1$-$T_N$. In the parent images $VF_1$-$VF_N$, a part of regions are selected as the interested regions (Region of Interest) $ROI_1$-$ROI_B$, wherein N and B are positive integer.

Figure 5:
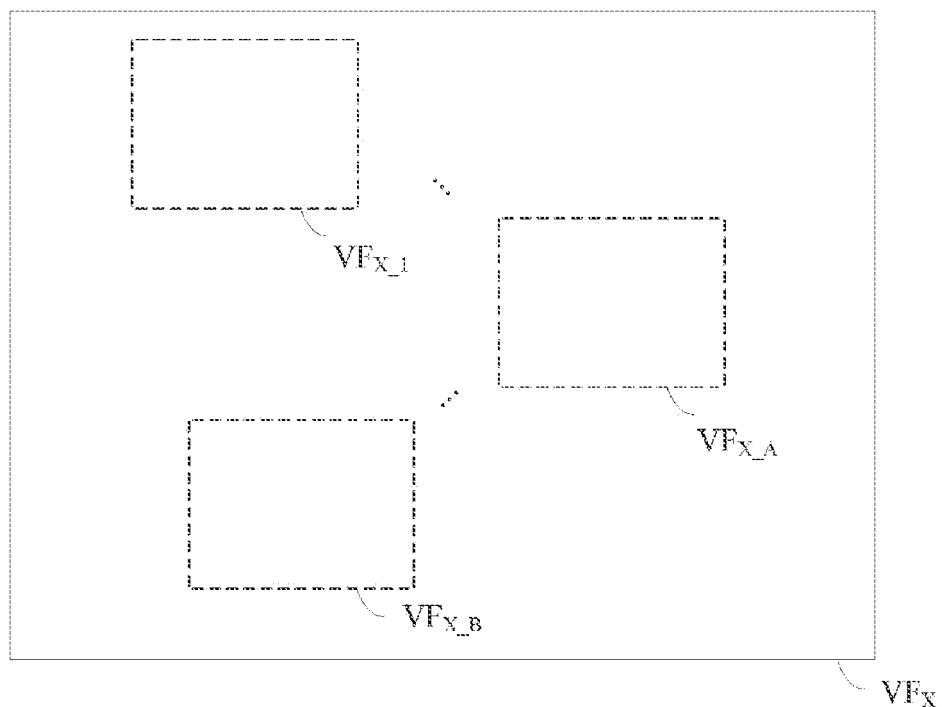
FIG. 5 is an illustration diagram of a parent image and sub-region images of in interested regions.

Referring to FIG. 5, FIG. 5 is an illustration diagram of a parent image and sub-region images of in the interested regions. In FIG. 5, an example of parent image $VF_x$ will be illustrated below, the image of in the interested region $ROI_1$ is the sub-region image $VF_{X\_1}$, the image of in the interested region $ROI_B$ is the sub-region image $VF_{X\_B}$, and so forth. There is no particular limitation on the range of the interested regions $ROI_1$-$ROI_B$, it can be staggered or overlapped, even an interested region can be in a range including a complete parent image. The image processor 410 uses the method 300 to determine whether a sub-region image of in the interested region of the parent images $VF_1$-$VF_N$ is a foreground image or a background image, and based on this to generate a foreground and background signals $S_{FB}$. Furthermore, the image processor 410 post-processes the parent images $VF_1$-$VF_N$, thereby generating post-processed images $IMG_1$-$IMG_N$. After the image compression circuit 430 adjusts a bit rate of each interested region according to the foreground and background signals $S_{FB}$, the post-processed images $IMG_1$-$IMG_N$ will be compressed, thereby generating an output signal $S_{OUT}$, wherein the output signal $S_{OUT}$ can be, for example, H.264, H.265 or MJPEG format compression video, or JPEG format compression picture. When the foreground and background signal $S_{FB}$ represents the image of in the interested region $ROI_A$ of the post-processed image is a background image, the image compression circuit 430 can compress the image of in the interested region $ROI_A$ by a lower bit rate. Examples of the interested region $ROI_A$, the steps of method 300 will be illustrated below:

a step 310, generating a characteristic data of each of sub-region images $VF_{1\_A}$-$VF_{N\_A}$ of in the interested region $ROI_A$ of parent images $VF_1$-$VF_N$;

a step 320, classifying the sub-region images $VF_{1\_A}$-$VF_{N\_A}$ to image groups of image groups $GP_1$-$GP_M$ according to the characteristic data of each of the sub-region images $VF_{1\_A}$-$VF_{N\_A}$; a step 330, obtaining a motion level of each of the image groups $GP_1$-$GP_M$ according to a motion area of in each of the sub-region images $VF_{1\_A}$-$VF_{N\_A}$;

a step 340, classifying each of the image groups $GP_1$-$GP_M$ to belong to a background image group or a foreground image group according to a motion level of each of the image groups $GP_1$-$GP_M$ and an image quantity of in each of the image groups $GP_1$-$GP_M$.

In the step 310, the images of in the interested region $ROI_A$ of the parent images $VF_1$-$VF_N$ separately be the sub-region images $VF_{1\_A}$-$VF_{N\_A}$. The image processor 410 generates each characteristic data corresponding to each of the sub-region images $VF_{1\_A}$-$VF_{N\_A}$ according to each pixel data of each of the sub-region images $VF_{1\_A}$-$VF_{N\_A}$. For example, but not limited to the characteristic data could be an average value of brightness, an average value of color coordinates, or a data of brightness distribution. Examples of the N being 30 and the characteristic data being the average value of brightness will be further illustrated below.

Figure 1:
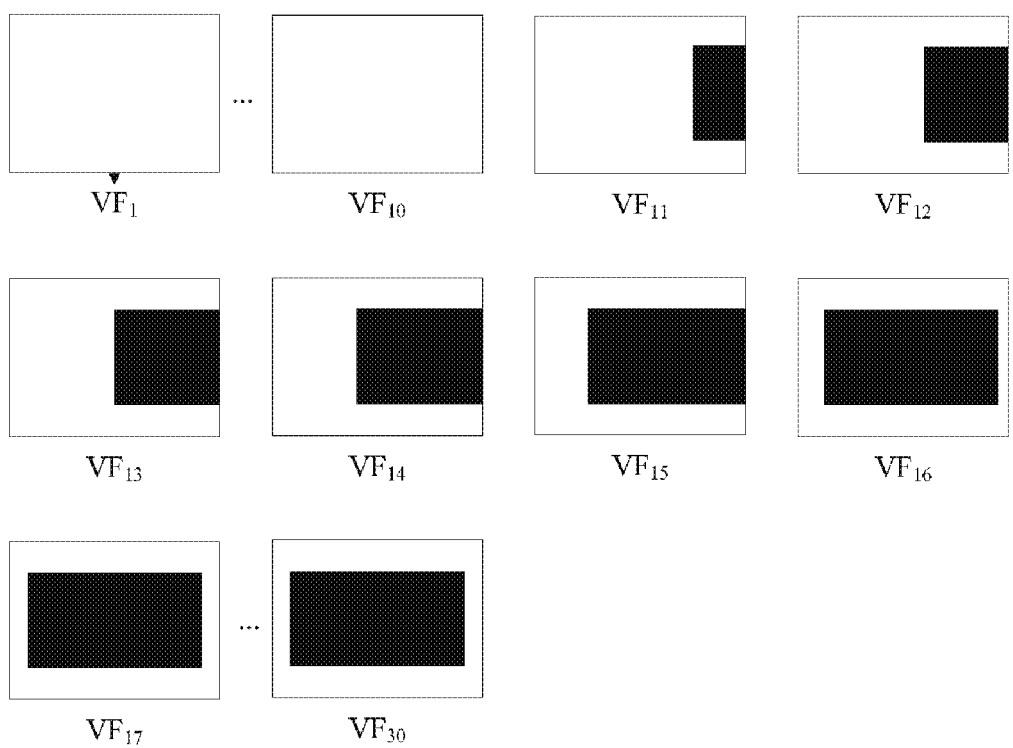
FIG. 1 is a prior art illustration of images captured by an image apparatus when a black object moves from right to left into a white background.
Figure 6:
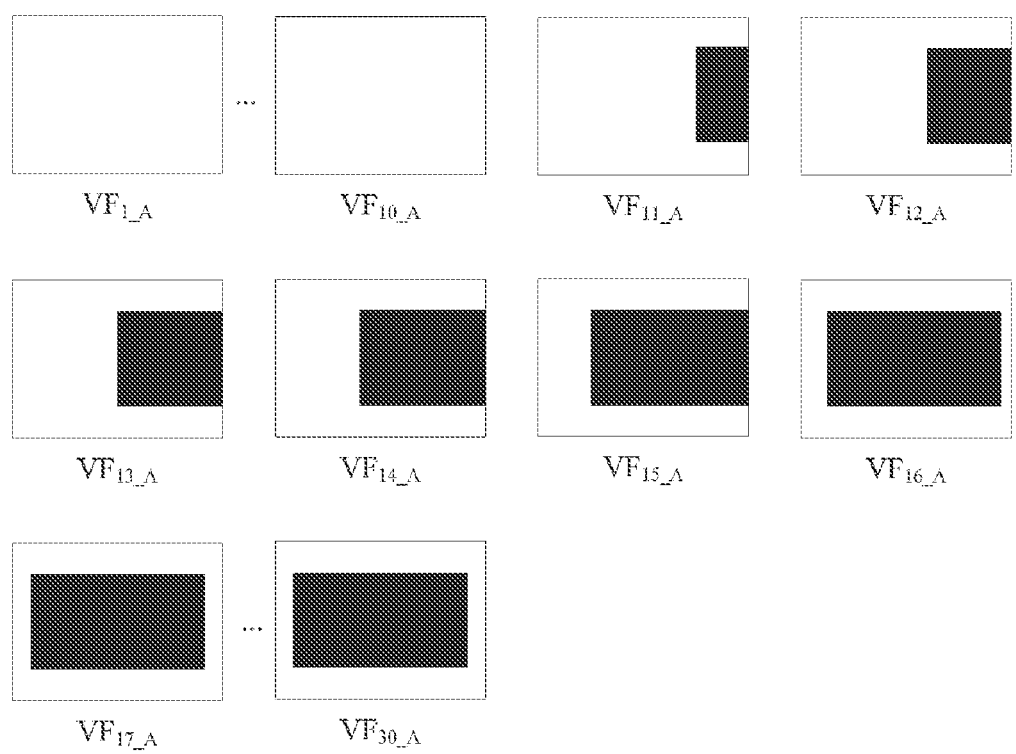
FIG. 6 is an illustration diagram of the sub-region images of the interested region.

Referring to FIG. 6, the FIG. 6 is an illustration diagram of the sub-region images $VF_{1\_A}$-$VF_{N\_A}$ of the interested region $ROI_A$. FIG. 6 is similar to FIG. 1, in a viewable range corresponding to the interested region $ROI_A$, a black object moves from right to left into a white background. Thus, sub-region images $VF_{1\_A}$-$VF_{30\_A}$ illustrated in FIG. 6 is similar to images $VF_1$-$VF_{30}$ illustrated in the FIG. 1. according to each pixel data of the sub-region images $VF_{1\_A}$-$VF_{N\_A}$ of the interested region $ROI_A$, the image processor 410 generates the average value of brightness of the sub-region images $VF_{1\_A}$-$VF_{30\_A}$ corresponding to the interested region $ROI_A$, wherein the brightness value is in the range of 0 to 255, the brightness value "0" means darkest, the brightness value "255" means brightest. Each of the sub-region images $VF_{1\_A}$-$VF_{10\_A}$ has the white background, so each average brightness value of the sub-region images $VF_{1\_A}$-$VF_{10\_A}$ is "255". In the sub-region images $VF_{11\_A}$-$VF_{15\_A}$, the black object gradually moves into the interested region $ROI_A$, so the average brightness values of the sub-region images $VF_{11\_A}$-$VF_{15\_A}$ separately be 213, 191, 170, 149, and 128. In the sub-region images $VF_{16\_A}$-$VF_{30\_A}$, the black object has been fully entered in a viewable range of the interested region $ROI_A$, so each average brightness value of the sub-region images $VF_{16\_A}$-$VF_{30\_A}$ is "120".

Referring to FIG. 7, FIG. 7 is an illustration of a statistics table of the average brightness values of the sub-region images $VF_{1\_A}$-$VF_{30\_A}$, it includes a statistics table illustrating an image quantity of each of the image groups $GP_1$-$GP_M$ and its motion levels, wherein the sub-region images $VF_{1\_A}$-$VF_{30\_A}$ have been classified to the image groups $GP_1$-$GP_M$. M is set as "8", the average brightness values from 0 to 255 be divided into 8 data sections $SEC_1$-$SEC_8$, and the image groups $GP_1$-$GP_8$ respectively correspond to the data sections $SEC_1$-$SEC_8$. The data section $SEC_1$ corresponds to the range of the brightness value 0 to 31, the data section $SEC_2$ corresponds to the range of the brightness value 32 to 63, and so forth. Therefore, the range of brightness values corresponding to the data sections $SEC_3$-$SEC_8$ can be obtained.

In the step 320, the image processor 410 classifies the sub-region images $VF_{1\_A}$-$VF_{30\_A}$ to the respective corresponding image group of in the image groups $GP_1$-$GP_8$, it is based on the characteristic data of each of the sub-region images $VF_{1\_A}$-$VF_{30\_A}$. More specifically, the average brightness value of each of the sub-region images $VF_{1\_A}$-$VF_{10\_A}$ is "255", which is in the brightness value range corresponding to the data section $SEC_8$, therefore the sub-region images $VF_{1\_A}$-$VF_{10\_A}$ should be classified to the image group $GP_8$, and so forth. Therefore, the sub-region images $VF_{11}$, $VF_{12}$, $VF_{13}$, $VF_{14}$, $VF_{15}$ should be respectively classified to the image groups $GP_7$, $GP_6$, $GP_6$, $GP_5$, $GP_5$, and the sub-region images $VF_{16\_A}$-$VF_{30\_A}$ should be classified to the image group $GP_4$.

In the step 320, assuming that the characteristic data is a Lab color coordinate, the image processor 410 can classify the sub-region images $VF_{1\_A}$-$VF_{30\_A}$ to respective corresponding image group of in the image groups $GP_1$-$GP_8$, it is based on each Euclidean distance between the characteristic data of each of the sub-region images $VF_{1\_A}$-$VF_{30\_A}$ and the representative characteristic data of each of the data sections $SEC_1$-$SEC_8$. For example, 8 color coordinate points being specific can be selected as the representative characteristic data of each of the data sections $SEC_1$-$SEC_8$. In this way, the image processor 410 can calculate each the Euclidean distance between the average values of color coordinate of each of the sub-region images $VF_{1\_A}$-$VF_{30\_A}$ and the representative characteristic data of each of the data sections $SEC_1$-$SEC_8$. When there is a shortest Euclidean distance between a sub-region image and a representative characteristic data of a data section, the sub-region image will be classified to an image group corresponding to the data section.

In the step 330, the image processor 410 renews the motion levels of the image groups $GP_1$-$GP_8$ according to the motion area of in the sub-region images $VF_{1\_A}$-$VF_{30\_A}$. In a further description, the image processor 410 compares the parent image $VF_1$ and the parent image $VF_2$, thereby obtaining the motion area of the sub-region images $VF_{2\_A}$; the image processor 410 compares the parent image $VF_2$ and the parent image $VF_3$, thereby obtaining the motion area of the sub-region images $VF_{3\_A}$, and so forth and so on.

Figure 8:
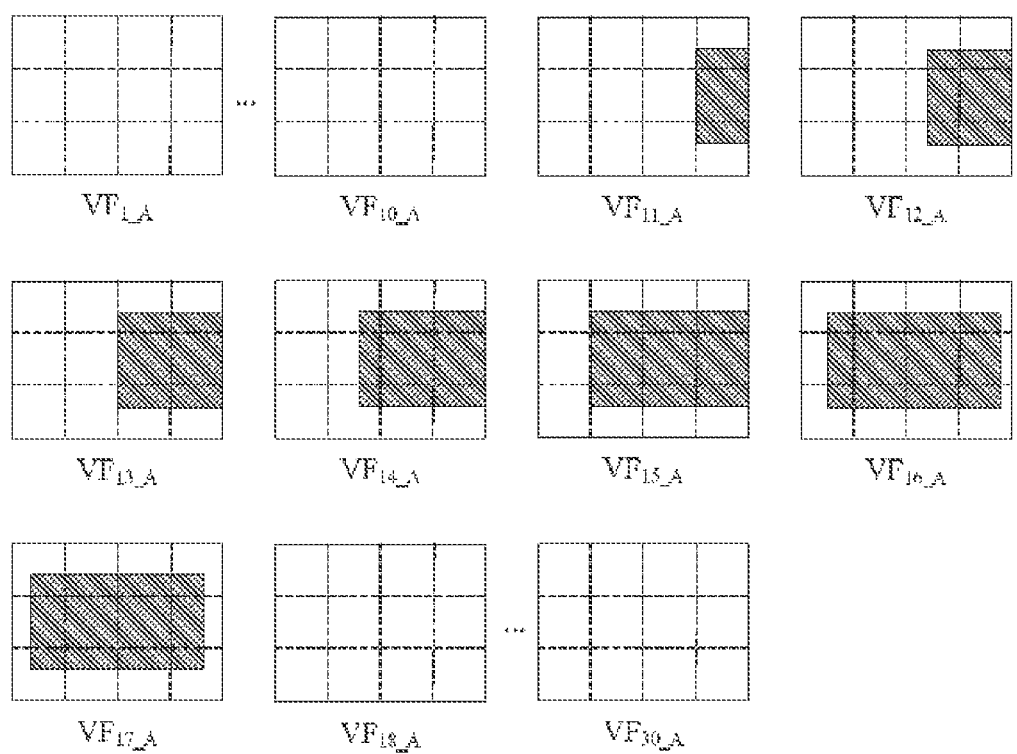
FIG. 8 is an illustration of a motion area of each of the sub-region images.

Referring to FIGS. 8 to 9, FIG. 8 is an illustration of a motion area of each of the sub-region images $VF_{1\_A}$-$VF_{30\_A}$, FIG. 9 is an illustration of a statistics table of a motion block quantity of each of the sub-region images $VF_{1\_A}$-$VF_{30\_A}$, it includes a statistics table illustrating an image quantity of each of the image groups $GP_1$-$GP_8$ and its motion levels. In the FIG. 8, the sub-region images $VF_{1\_A}$-$VF_{30\_A}$ are divided into 12 blocks by dashed lines, the area having slant line represents the motion area of in the sub-region images $VF_{2\_A}$-$VF_{30\_A}$. The image processor 410 obtains a statistics table of a motion block quantity corresponded to each of the sub-region images $VF_{1\_A}$-$VF_{30\_A}$ (as shown in FIG. 9), which is based on a block covered by the motion area of each of the sub-region images $VF_{1\_A}$-$VF_{30\_A}$ (as shown in FIG. 8). A motion block quantity of in each sub-region image can be used as a motion level of each the sub-region image. In a further description, When the image processor 410 receives the sub-region images $VF_{1\_A}$-$VF_{10\_A}$, the sub-region images $VF_{1\_A}$-$VF_{10\_A}$ belong to the image group $GP_8$, a motion block quantity of in the sub-region images $VF_{1\_A}$-$VF_{10\_A}$ is "0", the image processor 410 will sum the motion level of the image group $GP_8$ to the motion levels of the sub-region images $VF_{1\_A}$-$VF_{10\_A}$, the motion level of the image group $GP_8$ is renewed as "0". When the image processor 410 receives the sub-region image $VF_{11\_A}$, the image processor 410 will sum the motion level of the image group $GP_7$ to the motion level of the sub-region image $VF_{11\_A}$, the motion level of the image group $GP_7$ is renewed as "3". When the image processor 410 receives the sub-region image $VF_{12\_A}$, the image processor 410 will sum the motion level of the image group $GP_6$ to the motion level of the sub-region image $VF_{12\_A}$, the motion level of the image group $GP_6$ is renewed as "6". When the image processor 410 receives the sub-region image $VF_{13\_A}$, the image processor 410 will sum the motion level of the image group $GP_6$ to the motion level of the sub-region image $VF_{13\_A}$, the motion level of the image group $GP_6$ is renewed as "12", and so forth and so on. Therefore, the statistics table of the motion levels of the image groups $GP_1$-$GP_8$ can be obtained as FIG. 9 shows.

Figure 10:
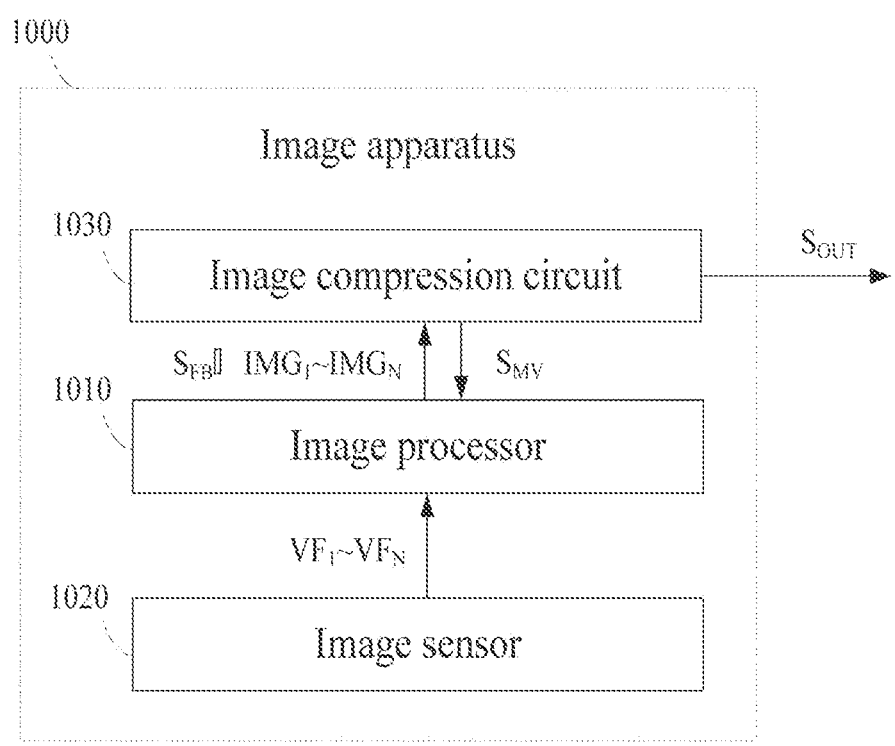
FIG. 10 is a structure diagram of an image apparatus which can be applied to the method of another embodiment of the present invention.

Referring to FIG. 10, in addition to the above calculation method, the present invention illustrates another embodiment for the motion levels of the sub-region images, FIG. 10 is an illustration of a structure diagram of an image apparatus 1000 of another embodiment of the present invention. The image apparatus 1000 comprises an image sensor 1020, an image processor 1010 and an image compression circuit 1030. The difference between the image apparatus 1000 and the image apparatus 400 is that: the image compression circuit 1030 compares adjacent parent images of in the parent images $VF_1$-$VF_{30}$, thereby generating a motion vector signal $S_{MV}$. The motion vector signal $S_{MV}$ includes motion vector information of each block of in the parent images, wherein the block can be a Macroblock of H.264 or LCU (largest coding unit) of H.265. In this embodiment, the image processor 1010 can obtain a non-stationary motion vector quantity of plural blocks of each the sub-region images $VF_1$-$VF_{30}$ according to the motion vector signal $S_{MV}$, the non-stationary motion vector quantity of plural blocks of each the sub-region images $VF_1$-$VF_{30}$ can be used as each the motion level of each of the sub-region images $VF_1$-$VF_{30}$.

In another embodiment, a motion level of a sub-region image is obtained according to an object information which is detected by the image processor 1010. In a further description, the image processor 1010 detects an object of in the parent images according to the motion vector signal $S_{MV}$, thereby obtaining the object information of in the parent images. Some examples as following.

Figure 11:
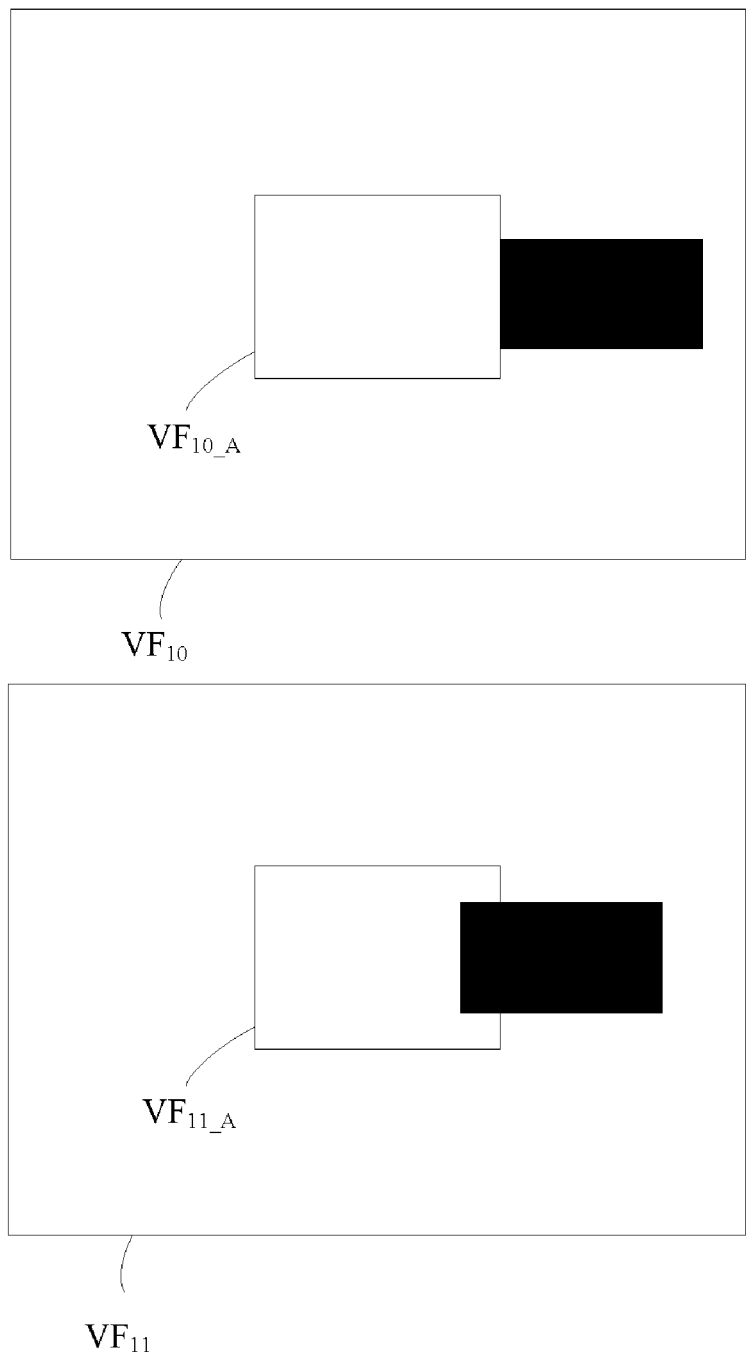
FIGS. 11-12 are diagrams illustrating that an image processor obtains object information according to a motion vector signal.
Figure 12:
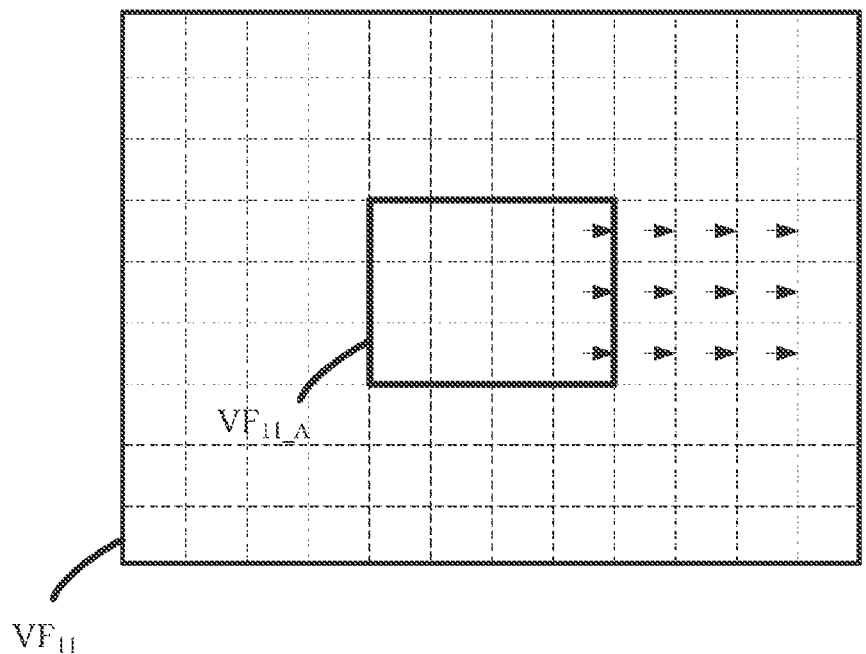

Referring to FIGS. 11 to 12, FIGS. 11-12 are diagrams illustrating that the image processor 1010 obtains the object information according to the motion vector signal $S_{MV}$. The image processor 1010 compares the parent images $VF_{11}$ and $VF_{10}$ of in FIG. 11, thereby obtaining the motion vectors which are indicated by arrows of in FIG. 12. Moreover, the parent image $VF_{11}$ is divided into plural blocks by dashed lines, arrows of in the block of in the parent image $VF_{11}$ directs to a most similar block of in the adjacent range of in the parent image $VF_{10}$.

Figure 13:
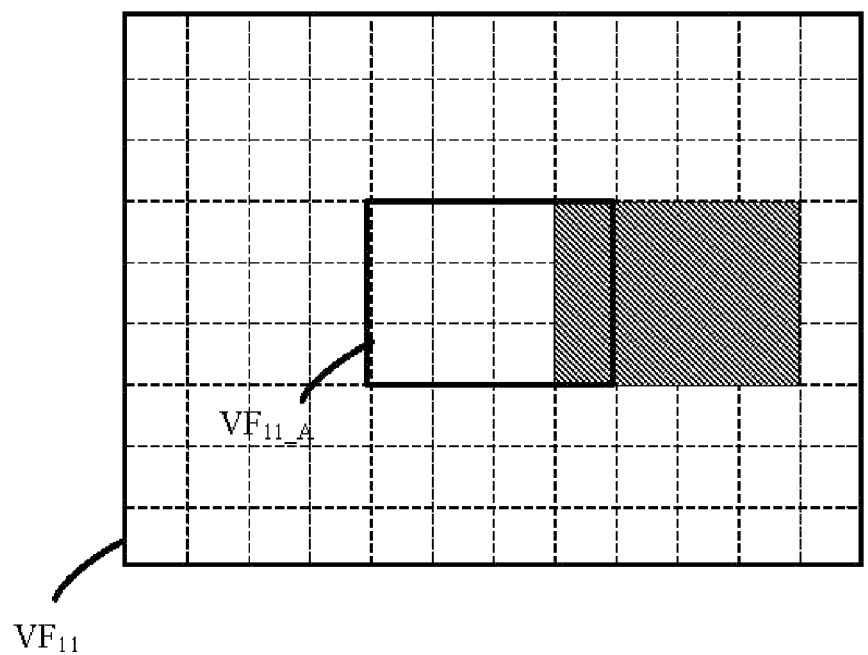
FIG. 13 is an illustration of an object which is detected by the image processor.

Referring to FIG. 13, FIG. 13 is an illustration of an object which is detected by the image processor 1010. The image processor 1010 obtains motion vector information of each block shown in FIG. 12 according to the motion vector signal $S_{MV}$. After the image processor 1010 groups the blocks which have enough large motion vector of in the parent image $VF_{11}$, it can detect out an object represented by slant lines of in FIG. 13. In a further description, when a size of the area occupied by the grouped motion block is greater than a motion threshold, the image processor 1010 will determine that the grouped block is an object; when the size of the area occupied by the grouped motion block is smaller than a motion threshold, the image processor 1010 will determine that the grouped block is a noise, not a moving object. As the above description, the image processor 1010 compares the motion vectors of the blocks of in the adjacent parent images of in the parent images $VF_1$-$VF_{30}$, and after grouping the blocks which have enough large motion vector, the image processor 1010 can detect to obtain an object size of in each of the parent images $VF_1$-$VF_{30}$ and a motion information of each of the parent images $VF_1$-$VF_{30}$. In this way, the image processor 1010 can obtain a block quantity belonging to having a moving object of in the interested region $ROI_A$ of in the period $T_{11}$, which is based on an object size of in the interested region $ROI_A$ of the parent image $VF_{11}$ and a motion information of the parent image $VF_1$, therefore the block quantity can be used as a motion level of the sub-region image $VF_{11\_A}$.

In the step 340, the image processor 410 classifies each of the image groups $GP_1$-$GP_M$ to belonging to a background image group or belonging to a foreground image group, which is based on a motion level of the image groups $GP_1$-$GP_M$ and an image quantity of in each of the image groups $GP_1$-$GP_M$. Referring to FIG. 9, FIG. 9 is an illustration of a statistics table of an image quantity and a motion level of each of the image groups $GP_1$-$GP_8$. When an image group is a background image group, the image group has a larger quantity of images, the motion level of the image group is smaller. When an image group is not a background image group, the image group can be determined as a foreground image group. In a further description, the image processor 410 compares each the image quantity of the image groups $GP_1$-$GP_8$ with a quantity threshold, the image processor 410 also compares each the motion level of the image groups $GP_1$-$GP_8$ with a motion threshold. When an image quantity of an image group is greater than a quantity threshold, and a motion level of an image group is less than a motion threshold, the image processor 410 determines that the image group is a background image group. For example, the quantity threshold is set as "8", the motion threshold is set as "5", the image processor 410 determines that the image group $GP_8$ is a background image group, the other image groups $GP_1$-$GP_7$ are foreground image groups. Furthermore, when an image belongs to a background image group, the image is a background image; when the image belongs to a foreground image group, the image is a foreground image. Thus, the sub-region images $VF_{1\_A}$-$VF_{10\_A}$ are background images, the other sub-region images $VF_{11\_A}$-$VF_{30\_A}$ are foreground images. As the above description, even if a foreground object stops moving and stays in a viewable range of the image apparatus, the method 300 illustrated in the present invention can correctly determine that the sub-region images $VF_{1\_A}$-$VF_{10\_A}$ are background images, the sub-region images $VF_{11\_A}$-$VF_{30\_A}$ are foreground images, so that will bring greater convenience to users.

Furthermore, in the method 300, the image processor 410 can select the latest received N consecutive parent images to determine whether a latest sub-region image is a foreground image or a background image. For example, when the image processor 410 receives the parent image $V_N$, the image processor 410 determines whether the latest sub-region image $VF_{N\_A}$ is a foreground image or a background image, which is based on the latest received N consecutive parent images $VF_1$-$VF_N$. When the image processor 410 receives the parent image $V_{(N+1)}$, the image processor 410 determines whether the latest sub-region image $VF_{(N+1)\_A}$ is a foreground image or a background image, which is based on the latest received N consecutive parent images $VF_2$-$VF_{(N+1)}$. Some examples as following.

Referring to FIG. 14, FIG. 14 is an illustration of a statistics table of an image quantity and a motion level of each of the image groups $GP_1$-$GP_8$, it assumes a situation that the black object has not moved and a screen of the parent image $V_{(N+1)}$ is same as the parent image $V_N$. In FIG. 14, an example of N being equal to 30, when the image processor 410 receives the parent image $V_{31}$, the image processor 410 will generate a characteristic data of the sub-region image $V_{31\_A}$. The image processor 410 will classify the sub-region image $V_{31\_A}$ to corresponding image group of in the image groups $GP_1$-$GP_8$, which is based on the characteristic data of the sub-region image $V_{31\_A}$. Because of the brightness value of the sub-region image $V_{31\_A}$ is equal to the brightness value of the sub-region image $V_{30\_A}$, the image processor 410 will classify the sub-region image $V_{31\_A}$ to the image group $GP_4$, therefore the image processor 410 will sum the motion level of the image group $GP_4$ to the motion level "0" of the sub-region image $V_{31\_A}$.

Furthermore, because of the image processor 410 determines a foreground image or a background image according to the latest received N consecutive parent images, the image processor 410 will remove the sub-region image $VF_{1\_A}$ from the image groups. Therefore, the image processor 410 will subtract a motion level of the sub-region image $VF_{1\_A}$ from a motion level of the image group $GP_8$ which belongs to the sub-region image $VF_{1\_A}$, an image quantity of the image group $GP_8$ will be decreased "1". At this moment, because of the image group $GP_4$ belongs to the foreground image group, the sub-region image $V_{31\_A}$ will be the foreground image. In an example of embodiment, when the sub-region image $V_{31\_A}$ belongs to the foreground image group, the image compression circuit 430 will compress the processed image $IMG_{31\_A}$ generated by according to the sub-region image $V_{31\_A}$, thereby generating an output signal $S_{OUT2}$, wherein the output signal $S_{OUT2}$ is a video or a picture containing a foreground object, users can be informed to confirm the foreground object. In another example of embodiment, the image compression circuit 430 will generate the output signal $S_{OUT2}$, which is based on the information of whether the sub-region images of in each of the interested regions $ROI_1$-$ROI_B$ belongs to the background image group or the foreground image group. In this way, when a display device receives the output signal $S_{OUT}$ and the output signal $S_{OUT2}$, the output signal $S_{OUT}$ will be decompressed by the display device, thereby obtaining a post-processed image. Moreover, the display device can decide a display manner of the post-processed image, which is based on the information of whether each sub-region image of in the output signal $S_{OUT2}$ belongs to the background image group or the foreground image group. For example, the display device partially enlarges the range having most foreground images, or the display device marks the area having the foreground image on the displayed image. In another embodiment, when the image compression circuit 430 compresses the parent image $VF_{31}$, the image compression circuit 430 will adjust a bit rate of in the interested region $ROI_A$, which is based on whether the sub-region image $V_{31\_A}$ of in the interested regions $ROI_A$ of the parent image $VF_{31}$ belongs to the background image group or the foreground image group, thereby accordingly generating the output signal $S_{OUT}$. In a further description, when the image compression circuit 430 compresses the parent images, the image compression circuit 430 can adjust a bit rate of in the interested regions $ROI_1$-$ROI_B$, which is based on whether the sub-region images of in each of the interested regions $ROI_1$-$ROI_B$ belong to the background image group or the foreground image group, thereby accordingly generating the output signal $S_{OUT}$.

Furthermore, in order to avoid that the ambient light and shadow changes is incorrectly determined as a foreground object, and in order to avoid that the turning on and off a light source is incorrectly determined as a foreground object, in the method 300, when the image processor 410 receives the parent image $VF_{(N+1)}$, the image processor 410 can decide to ignore the parent image $VF_{(N+1)}$ and its sub-region images $VF_{(N+1)\_1}$-$VF_{(N+1)\_B}$, which is based on the difference between the parent image $VF_N$ and the parent image $VF_{(N+1)}$ is greater than an image difference threshold, thereby maintaining the motion levels of the image groups $GP_1$-$GP_8$ and the image quantity of each of the image groups $GP_1$-$GP_8$ without change. For example, the image processor 410 calculates the absolute difference between a pixel data of the parent image $VF_{31}$ and a pixel data of the parent image $VF_{30}$, and when a absolute difference of each pixel accumulated by the image processor 410 is greater than the image difference threshold, the image processor 410 will decide to ignore the parent image $VF_{31}$ and its sub-region images $VF_{31\_1}$-$VF_{31\_B}$, thereby maintaining the motion levels of the image groups $GP_1$-$GP_8$ and the image quantity of the image groups $GP_1$-$GP_8$ without change. Moreover, when an object is moving into the interested region $ROI_A$, the characteristic data and the motion level of the sub-region image will be unstable, that will easily cause an incorrect determination. Thus, when the image processor 410 receives the parent image $VF_{(N+1)}$, and there is a motion block detected at the boundary of the interested region $ROI_A$ of the parent image $VF_{(N+1)}$, the image processor 410 can ignore the sub-region image $VF_{(N+1)\_A}$, thereby maintaining the motion levels of the image groups $GP_1$-$GP_8$ and the image quantity of each of the image groups $GP_1$-$GP_8$ without change. Therefore, the rate of incorrect determination can be further reduced.

Furthermore, the present invention can also be integrated with a method of target object detection, and a detection accuracy of various target foreground object can be improved by the method of the present invention. For example, the image processor 410 or the image processor 1010 can use the detection methods of different target objects to detect different object types of in the sub-region image of the interested region (e.g., pedestrian detection, vehicle detection), thereby obtaining a characteristic value of a target object of each sub-region image. The following example uses a pedestrian as the target object to further description.

Figure 15:
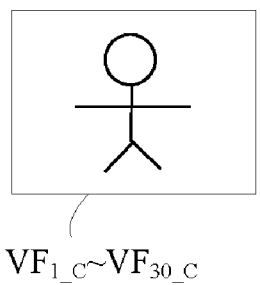
FIG. 15 is an illustration of assuming that the sub-region images have a static human standee in the interested region.

Referring to FIGS. 15 to 16, FIG. 15 is an illustration of assuming that the sub-region images $VF_{1\_C}$-$VF_{30\_C}$ have a static human standee in the interested region $ROI_C$ during a periods $T_1$ to $T_{30}$, FIG. 16 is a statistics table illustrating an image quantity, a motion level and a pedestrian characteristic value of each of the sub-region images $VF_{1\_C}$-$VF_{30\_C}$ classified to each of the image groups. Assuming that a pedestrian characteristic value calculated by a pedestrian detection method is "1" for the human standee in each sub-region image, accumulating the pedestrian characteristic value of each of the sub-region images $VF_{1\_C}$-$VF_{30\_C}$ is "30" for an image group $GP_6$.

A traditional pedestrian detection method will compare the pedestrian characteristic value "30" with a target object threshold, thereby determining whether there is a foreground pedestrian in the interested region $ROI_C$. Assuming that the target object threshold is "5", at this moment, because of there is a static human standee in the interested region $ROI_C$, the traditional pedestrian detection method will make an incorrect determination that sub-region images $VF_{1\_C}$-$VF_{30\_C}$ classified to an image group $GP_4$ have a pedestrian in the interested region $ROI_C$. That is to say, the traditional pedestrian detection method will make an incorrect determination that the sub-region images $VF_{1\_C}$-$VF_{30\_C}$ have a target foreground object. As to a comparison of the traditional pedestrian detection method, in addition to a pedestrian characteristic value of an image group, the method of the present invention will simultaneously compare a motion level and a motion threshold of the image group. When a pedestrian characteristic value of an image group is greater than a target object threshold, and a motion level of the image group is greater than a motion threshold, the method of the present invention will determine that there is a target foreground object in a sub-region image classified to the image group. When a pedestrian characteristic value of an image group is greater than a target object threshold, and a motion level of the image group is less than or equal to a motion threshold, the method of the present invention will determine that there is no a target foreground object in a sub-region image classified to the image group. Because of the human standee is static during the periods $T_1$ to $T_{30}$, the motion level of the image group $GP_6$ will be "0". The motion threshold is set as "5", because of the motion level "0" of the image group $G_6$ is less than the motion threshold "5", the method of the present invention will determine that there is no a pedestrian in the image groups. As the above description, the traditional pedestrian detection method will easily make an incorrect determination for the human standee in a picture. However, the method of the present invention considers the information of the motion level, therefore the method of the present invention can truly identify a pedestrian walking in the image.

Figure 17:
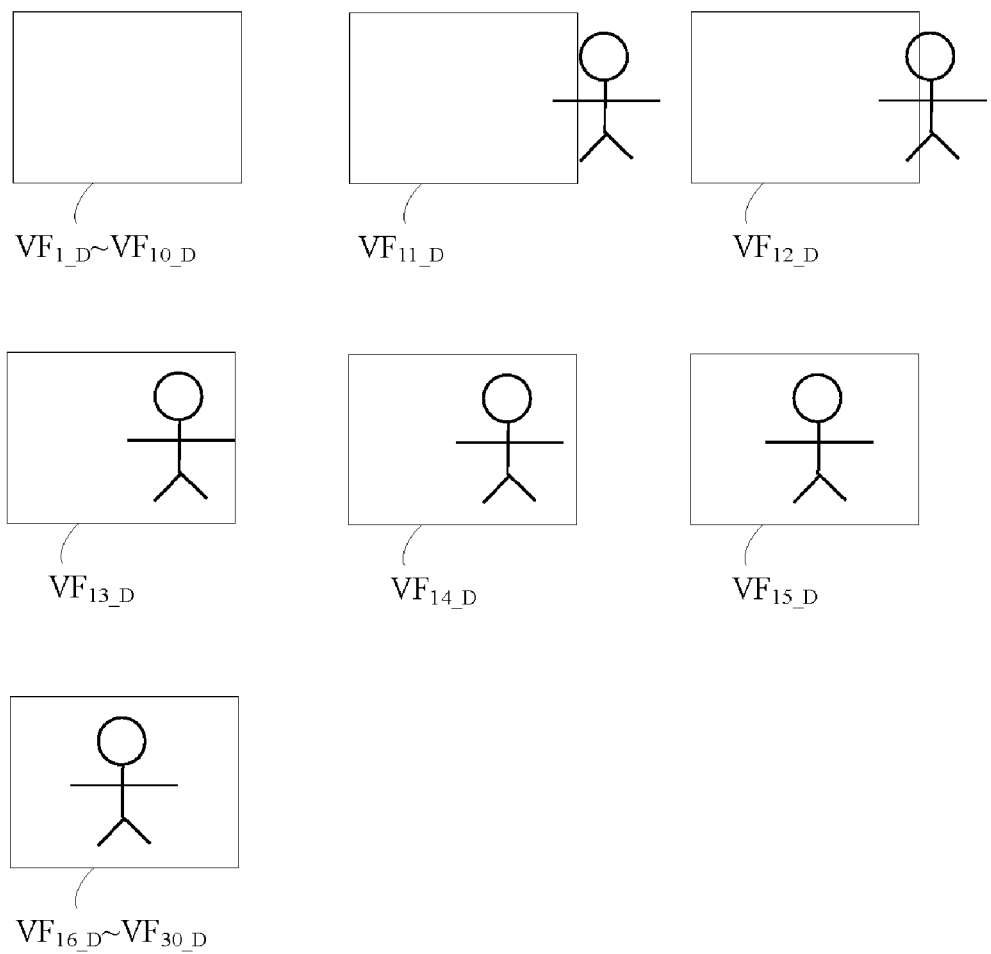
FIG. 17 is an illustration of assuming that the sub-region images of in the interested region have a pedestrian moving into the white background.

Referring to FIGS. 17 to 18, FIG. 17 is an illustration of assuming that the sub-region images $VF_{1\_D}$-$VF_{30\_D}$ of in the interested region $ROI_D$ during the periods $T_1$ to $T_{30}$ have a pedestrian moving into the white background, FIG. 18 is a statistics table illustrating an image quantity, a motion level and a pedestrian characteristic value of each of the sub-region images $VF_{1\_D}$-$VF_{30\_D}$ classified to each the image groups. As shown in FIG. 17, in the sub-region images $VF_{1\_D}$-$VF_{10\_D}$ corresponding to the periods $T_1$-$T_{30}$, the pedestrian is located at the outside of the range of the interested region $ROI_D$, at this moment, each of the sub-region images $VF_{1\_D}$-$VF_{1\_0D}$ will be the white background, and therefore, both of the motion level and the pedestrian characteristic value of the image group $GP_8$ will be "0". In the sub-region images $VF_{11\_D}$-$VF_{12\_D}$ corresponding to the periods $T_{11}$-$T_{12}$, the pedestrian is moving, and a little portion of the pedestrian is entering the range of the interested region $ROI_D$, but it does not have enough the pedestrian characteristic value, and therefore, the motion level of the image group $GP_7$ will be "3", the pedestrian characteristic value of the image group $GP_7$ will be "0". In the sub-region images $VF_{13\_D}$-$VF_{15\_D}$ corresponding to the periods $T_{13}$-$T_{16}$, the pedestrian has been fully entered in the range of the interested region $ROI_D$, the pedestrian is still moving. In the sub-region images $VF_{16\_D}$-$VF_{30\_D}$ corresponding to the periods $T_{16}$-$T_{30}$, the pedestrian has been fully entered in the range of the interested region $ROI_D$, the pedestrian has been stopped moving, and therefore, the motion level of the image group $GP_6$ will be "12", the pedestrian characteristic value of the image group $GP_6$ will be "18". The motion threshold is set as "5", because of the motion level "12" of the image group $G_6$ is greater than the motion threshold "5", and the pedestrian characteristic value "18" of the image group $GP_6$ is greater than the target object threshold "5", the method of the present invention will determine that the image group $G_6$ is an image group having a target foreground object. That is to say, even if a target foreground object stops moving after it moves into the range of the interested region, the method of the present invention can correctly determine that whether there is a foreground pedestrian in each sub-region image of the interested region $ROI_D$ or not.

It is worth noting that, when the method of the present invention correctly determines whether each sub-region image of the interested region $ROI_D$ has a foreground pedestrian, its information can be further used as follows. For example, because of users will tend to pay more attention to a moving people in a picture, a bit rate of the image compression circuit 430 can be adjusted according to whether there is a foreground pedestrian in the interested region. When a sub-region image of in an interested region is classified to an image group having a foreground pedestrian, as to the compression of the parent image, a bit rate of the interested region will be increased. When a sub-region image of in an interested region is classified to an image group without a foreground pedestrian, the bit rate of the interested region will be reduced. Moreover, the above embodiment is not limited to a kind of object detection. The method of the present invention can be applied to a plurality of target object detections, and this just needs to expand the kind of target object detection. The method for simultaneously applying a plurality of target object detections will allow users that each interested region of in the parent image could has different kind of interested target objects, or users can dynamically switch the kind of interested target objects in the stream, therefore this system will adaptively adjust to distribute a bit rate of the stream to use for the kind of interested target objects. Thus, that will bring greater convenience to users.

In the summary, the invention provides a method for determining a foreground image and a background image, the method includes the following steps, generating a characteristic data of each of N sub-region images of in an interested region of N parent images, classifying the N sub-region images to image groups of in M image groups according to the characteristic data of each of N sub-region images, obtaining a motion level of each of the M image groups according to a motion area of in each of the N sub-region images, determining whether each the image group belongs to a background image group or a foreground image group according to each the motion level of each the image group and an image quantity of each the image group. Using the method provided by the present invention, even if a foreground object stops moving and stays in a viewable range of the image apparatus, the method can still correctly determine a foreground image and a background image, so that will bring greater convenience to users.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for determining a foreground image and a background image, the method comprising:
    generating a characteristic data of each of N sub-region images of an interested region of N parent images;
    classifying the N sub-region images to image groups of M image groups according to the characteristic data of each of the N sub-region images;
    obtaining a motion level of each of the M image groups according to a motion area of each of the N sub-region images;
    determining whether each of the image groups belongs to a background image group or a foreground image group according to the motion level of each of the image groups and an image quantity of each of the image groups;
    wherein M and N are positive integers;
    wherein the method further comprises obtaining a motion block quantity of each of the N sub-region images, which is based on a motion vector of plural blocks of each sub-region image, thereby using the motion block quantity of each sub-region image as a motion level of each sub-region image.

2. The method of claim 1, wherein a sub-region image classified to a background image group is a background image, and a sub-region image classified to a foreground image group is a foreground image.

3. The method of claim 1, wherein the M image groups respectively correspond to M data sections.

4. The method of claim 3, wherein the classifying the N sub-region images to image groups of M image groups according to the characteristic data of each of the N sub-region images, further comprises:
    classifying the N sub-region images to the M image groups, which is based on each Euclidean distance between the characteristic data of each of the N sub-region images and a representative characteristic data of each of the M data sections.

5. The method of claim 1, wherein the generating a characteristic data of each of N sub-region images of an interested region of N parent images, further comprises:
    generating a characteristic data of each of N sub-region images of an interested region of N parent images, which is based on a plurality of pixel data of the N sub-region images, wherein each characteristic data is an average value of brightness, an average value of color coordinates, or a data of brightness distribution.

6. The method of claim 1, wherein the method further comprises:
   comparing adjacent parent images of the N parent images, thereby obtaining motion vectors of the motion blocks of the N sub-region images.

7. The method of claim 1, wherein the method further comprises:
   generating a characteristic data of a (N+1)th sub-region image of an interested region of a (N+1)th parent image when the (N+1)th parent image is received;
   classifying the (N+1)th sub-region image to a first image group of the M image groups, which is based on the characteristic data of the (N+1)th sub-region image;
   summing a motion level of the first image group to a motion level of the (N+1)th sub-region image.

8. The method of claim 7, wherein the method further comprises:
   subtracting a motion level of a first sub-region image from a motion level of a image group belonging to the first sub-region image of the N sub-region images.

9. The method of claim 1, wherein the determining whether each of the image groups belongs to a background image group or a foreground image group according to the motion level of each of the image groups and an image quantity of each of the image groups, further comprises:
   comparing an image quantity of each of the M image groups with a quantity threshold;
   comparing a motion level of each of the M image groups with a motion threshold;
   thereby determining whether each of the image groups belongs to a background image group or a foreground image.

10. The method of claim 1, wherein the method further comprises:
    generating an object information of a first parent image of the N parent images, which is based on motion vectors of plural blocks of the first parent image and motion vectors of plural blocks of a second parent image;
    obtaining a motion level of a first sub-region image of the N sub-region images, which is based on an object size of the interested region of the first parent image and a motion information of the first parent image.

11. The method of claim 10, wherein the obtaining a motion level of a first sub-region image of the N sub-region images, which is based on an object size of the interested region of the first parent image and a motion information of the first parent image, further comprises:
    obtaining a block quantity belonging to having a moving object of the interested region in a first period, which is based on a motion block quantity occupied by an object of the interested region of the first parent image, thereby using the block quantity as a motion level of the first sub-region image.

12. The method of claim 1, wherein the method further comprises:
    deciding to maintain the motion levels of the M image groups and the image quantity of each of the image groups without change when a (N+1)th parent image is received, which is based on a difference between a N-th parent image of the N parent images and a (N+1)th parent image.

13. The method of claim 12, wherein the deciding to maintain the motion levels of the M image groups and the image quantity of each of the image groups without change when a (N+1)th parent image is received, which is based on a difference between a N-th parent image of the N parent images and a (N+1)th parent image, further comprises:
    deciding to maintain the motion levels of the M image groups and the image quantity of each image group without change, which is based on a difference between a characteristic data of the N-th parent image of the N parent images and a characteristic data of the (N+1)th parent image, and when the difference is greater than an image difference threshold.

14. The method of claim 1, wherein the method further comprises:
    deciding to maintain the motion levels of the M image groups and each the image quantity of each image group without change when a (N+1)th parent image is received, which is based on a boundary of an interested region of the (N+1)th parent image when there is a motion block detected.

15. The method of claim 1, wherein the method further comprises:
    adjusting a bit rate of a compressed (N+1)th parent image, when a (N+1)th parent image is received, which is based on whether a sub-region image of an interested region of the (N+1)th parent image belongs to a background image group or a foreground image group;
    compressing the (N+1)th parent image according to the adjusted bit rate, thereby generating a first output signal.

16. The method of claim 1, wherein the method further comprises:
    compressing a sub-region image of an interested region of a (N+1)th parent image when the sub-region image of the interested region of the (N+1)th parent image belongs to a foreground image group, thereby generating a second output signal.

17. The method of claim 1, wherein the method further comprises:
    generating a second output signal, which is based on a sub-region image of an interested region of a (N+1)th parent image belonging to information of a foreground image group.

18. The method of claim 1, wherein the method further comprises:
    generating a second output signal, which is based on a sub-region image of an interested region of a (N+1)th parent image belonging to information of a foreground image group
    detecting a target object of each sub-region image of an interested region of the N parent images, thereby obtaining a characteristic value of the target object of each sub-region image;
    obtaining each characteristic value of the target object of each image group, which is based on each characteristic value of the target object of each sub-region image;
    obtaining an image group belonging to a target foreground object of each image group, which is based on each motion level of each image group and each characteristic value of the target object of each image group.

19. The method of claim 18, wherein the obtaining an image group belonging to a target foreground object of each image group, which is based on each motion level of each image group and each characteristic value of the target object of each image group, further comprises:
    determining that a first image group belongs to an image group having a target foreground object, which is based on a characteristic value of the target object of the first image group of the M image groups and a motion level of the first image group, and when the characteristic value of the target object is greater than a target object threshold, and when the motion level is greater than a motion threshold.

20. The method of claim 18, wherein the method further comprises:

increasing a bit rate of a compressed interested region when a sub-region image of the interested region classified to an image group having a target foreground object.

* * * * *